3,644,571
PROCESS OF HEATING CAPROLACTAM GRAFT COPOLYMERS TO INCREASE MELT STRENGTH
Raymond P. Anderson and Francis R. Galiano, Oakland Park, Kans., assignors to Gulf Research & Development Company, Pittsburgh, Pa.
Filed Mar. 19, 1970, Ser. No. 20,905
Int. Cl. C08g 41/04
U.S. Cl. 260—857 G
6 Claims

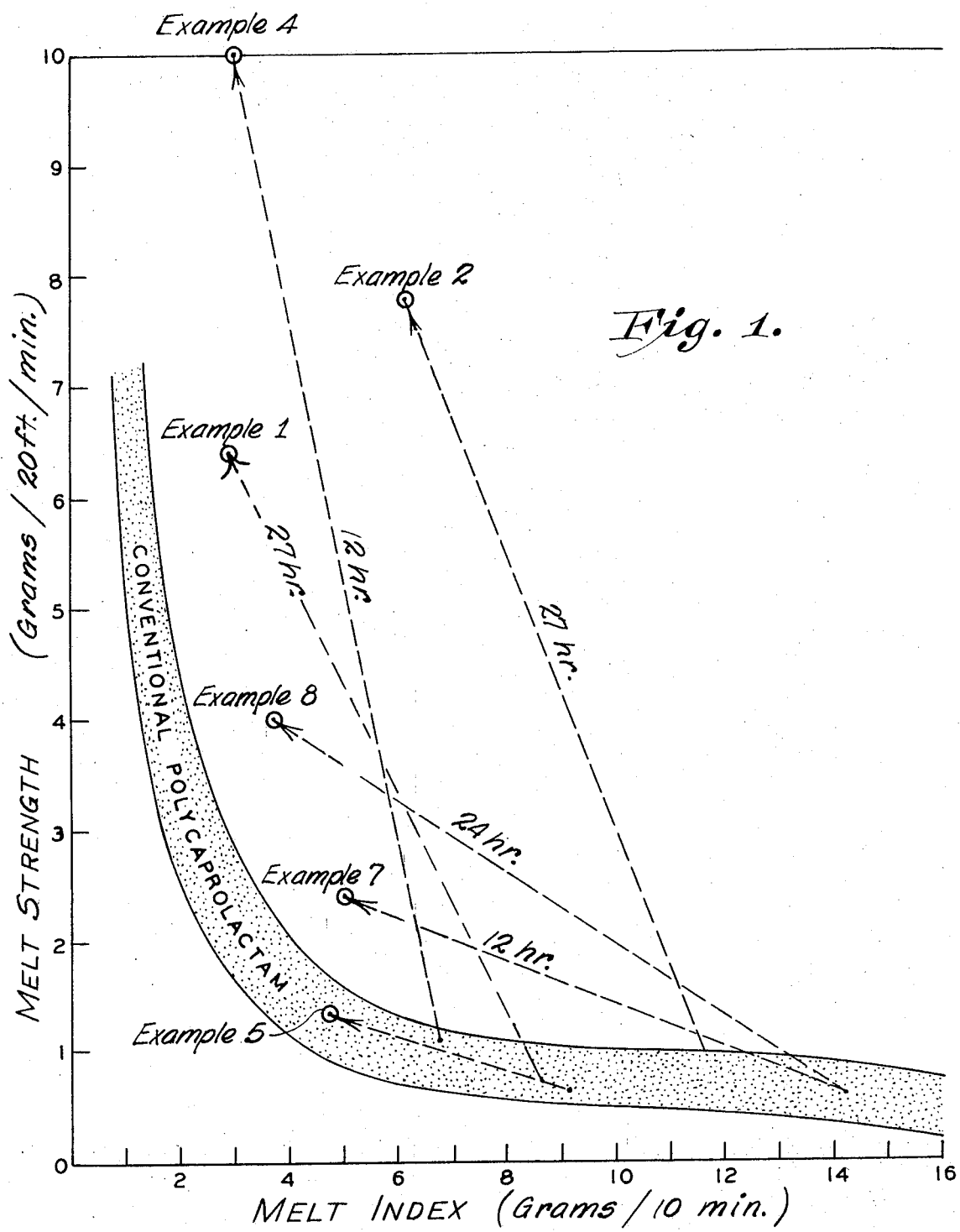

ABSTRACT OF THE DISCLOSURE

When olefin-maleic anhydride copolymers are employed at low levels in hydrolytic polymerization of caprolactam to yield grafted caprolactam copolymers, the resulting polymers upon heating in the solid state at a temperature of at least 140° C. increase in melt strength to values considerably above the melt strength of conventional polycaprolactam of equivalent melt index. The resulting products having high melt strength may be advantageously used for the manufacture of extruded and blow molded articles.

DESCRIPTION OF THE INVENTION

Long chain branching has been introduced into caprolactam polymers in a controlled manner by hydrolytic polymerization in the presence of certain copolymers. Conventional caprolactam polymers may be produced by hydrolytic polymerization using monomeric carboxylic acids or certain of their derivatives to promote the polymerization. For example, caprolactam may be polymerized in the presence of about 0.1 percent benzoic acid and about 1% water to yield a polymer of the conventional nylon 6 type. When the benezoic acid is replaced, for example, by from about 0.1 percent to 4 percent of a copolymer of ethylene, styrene or a 1-olefin having from 3 to 8 carbon atoms with maleic anhydride, maleic acid, maleamic acid, or a mono ester of maleic acid, graft copolymers of caprolactam may be obtained which upon heating in the solid state for at least 5 hours at temperatures above 140° C. acquire greatly improved melt strength.

Melt strength refers to the cohesive strength of the molten polymer. Normally caprolactam homopolymer may be made in high molecular weight with a great deal of resistance to flow so that the melt index is so low as to make extrusion almost unfeasible or the polymer can be made with lower molecular weight and reasonably high melt index but with a tendency to run like water when melted, so that extrusion and melt spinning are difficult. For purposes of injection molding and melt spinning, polymer with properties midway between these two extremes is usually employed, such products possessing a reasonably high melt index and sufficient melt strength so that melt spinning and drawing of fibers becomes feasible. This may be done for extrusion also, but the comprise is generally not satisfactory, in that extrusion is necessarily slow and uneconomical and there are practical limitations of minimum film gauge.

There have been previously disclosed graft copolymers of caprolactam made by hydrolytic polymerization of caprolactam with copolymers or the hydrolyzed copolymers of maleic anhydride with olefinic monomers. We have discovered that polymers of this type, after washing and drying in the customary manner to prepare them for commercial use can be heated under vacuum in the solid state for a period of several hours with the result that melt strength is greatly improved with relatively small decrease in melt index, so that polymers which can easily be extruded are obtained.

Melt strength is the outstanding property which characterizes the thermoplastic materials customarily employed in blow molding of articles such as plastic bottles and containers. Polymers with high melt strength can be extruded, blown or subjected to mechanical working of different forms while molten and in a deformable plastic state but still having sufficient strength to resist tensile stresses. Melt strength may be measured in various ways. One method involves the measurement of changes in the diameter of a strand of extrudate from a melt index apparatus. See, for example, Combs et al. J. Appl. Poly. Sci. II, 747 (1967). The above method gives some indication of gross changes in the melt strength but does not serve to indicate adequately small differences, for the purpose of making quantitative comparisons. A method which measures the strength of molten nylon in tension has been found to be much more satisfactory. The instrument used for measuring melt strength in this way is described by Kaltenbacker et al. in their article "The Use of Melt Strength in Predicting the Processability of Polyethylene Coating Resins," TAPPI, vol. 50, p. 20, 1967. The equipment consists essentially of a melt index apparatus combined with an Instron apparatus or other screw driven device to drive the melt index piston at a specified rate, a means of varying the rate of drive and a strain gage measuring system to measure the tensional force in grams required to draw down the polymer extrudate at a feasible rate. For a conventional nylon resin the melt strength is dependent upon the melt index. A number of nylon resins were examined to determine the relationship between melt strength and melt index and the zone which includes these values is the shaded area in the drawing (FIG. 1). Also shown in FIG. 1 are the results obtained by heating various caprolactam graft copolymers in the solid state, lines being drawn from points indicating starting values of melt index and melt strength to other points which indicate the final values of these properties after heating for the number of hours indicated on the drawing. It can be seen that in each instance there was what might be regarded as an expected decrease of melt index but the increase in melt strength was exceptionally high when compared with conventional resins. Conventional nylon resins when heated under vacuum in the solid state yield products having melt index and strength values remaining within the "normal" zone shown in FIG. 1. See Example 5, for instance, which is indicated in FIG. 1.

The manner of carrying out the invention is discussed below:

Polymerization of caprolactam in presence of copolymer

The molecular weight of the olefin-maleic anhydride copolymer may be varied from about 1000 to over 75,000. In actual practice, molecular weights from about 1000 to about 12,000 are preferred. Higher molecular weight olefin-maleic anhydride copolymers lead to high viscosity caprolactam graft copolymers. The high viscosities reached in such cases lead to practical problems in the manufacture of caprolactam graft copolymers as the high viscosity material is difficult to handle in conventional polymerization equipment. From a practical standpoint, it is more convenient to use a lower molecular weight olefin-maleic anhydride copolymer so that a product of normal viscosity and melt strength is obtained by the regular polymerization procedure. This material may then be subjected to further condensation by treating in the solid state to obtain a high melt strength polymer.

Post-polymerization of solid caprolactam graft copolymer

The process of heating polycaprolactam in the solid state in order to increase the molecular weight and hence the viscosity is known. At temperatures above about 140° C. condensation reactions take place with the release of water. In order to substantially increase the molecular weight of the polymer, it is necessary to remove water. This is generally done by carrying out the heating under high vacuum such as 1 mm. of mercury absolute pressure. Alternative methods of removing the water such as passing an inert gas over the solid polycaprolactam pellets may be used. Another method of effecting the increase in molecular weight is by heating the solid polycaprolactam in an inert liquid or its vapor so that the polymer is heated by the liquid or its vapor and water is removed from the polymer by azeotropic distillation.

Procedures for preparation of specific caprolactam graft copolymers and conversion to high strength products are illustrated below:

Batch reaction

Four hundred grams of caprolactam, 8 g. of styrene-maleic anhydride copolymer (SMA 3000A) and 8 g. of water were placed in a one liter resin kettle equipped with a condenser, stirrer and gas inlet and outlet. Argon gas flow through the reactor was started one hour before heat was applied and was continued until after the polymerization was completed. The reaction mixture was heated to 200° C. and maintained at that temperature over a two hour period after which it was heated to 265° C. and maintained at this temperature until a total heating time of 26 hours was reached. Cooling water was supplied to the condenser during the first seven hours of heating after which it was shut off and the stirrer removed.

After cooling, the raw polymer was ground and extracted with methanol and dried. The solution viscosity, melt index and melt strength of the extracted and dried polymer were determined.

Conversion by heating in the solid state was carried out in a drying pistol at 0.1-0.2 mm. Hg using refluxing diisobutyl ketone (B.P. 167-70° C.) as the constant temperature heat source.

Properties of specific resins prepared by hydrolytic batch polymerization in the presence of various copolymers, along with the effects of post polymerization are given in Table I. Included for the purpose of comparison are data for a conventional resin.

water and 1.0% of a styrene maleic anhydride copolymer, SMA 3000 A. Conditions used (reactor temperatures, levels, residence times, etc.) are substantially equivalent to those used in making a conventional nylon resin catalyzed by benzoic acid. The washed and dried product in a specific instance had a solution viscosity of 3.02, a melt index (235° C., 2160 g. load) of 11.4 grams/10 minutes and a melt strength of 0.7 grams. One portion of this material was heated for 12 hours at 165° C. and 1 mm. of mercury vacuum to give a product having a relative solution viscosity of 3.56, a melt index of 5.7 g./10 minutes and a melt strength of 3.6 grams. A second portion was heated for 24 hours under the same conditions to give a product having a relative solution viscosity of 3.81, a melt index of 3.95 grams/10 minutes and a melt strength of 5.3 grams.

The products of the method described above were melted and extruded into films and fibers, some of which were then subjected to drawing to reduce thickness of the extruded articles. The high melt strength resins possessed readily apparent advantages in the manufacture of blown film. The bubble was readily formed and was of good stability. Faster extruder output rates could be employed than with conventional nylon and higher film take-off speeds were possible. The film and fibers are somewhat stiffer than those made from a conventional resin. The film, in general, is less blocky and stiffer than that made from conventional nylon, and has a unique crispness and translucent appearance. Extruded sheet of approximately 1.5 mm. thickness is white and translucent in unpigmented form and may be readily drawn or vacuum formed when heated to softening temperature.

The products of improved melt strength made by the method of this invention are particularly useful for extrusion coating to yield multi-layered articles on a variety of substrates, including other polymers, paper and metal foils and sheets. Included among these multilayered products are nylon-coated aluminum foil and heat-sealable nylon-aluminum foil-polyethylene laminates for use as a heat sealable vapor barrier and heat-reflecting sheet in packaging and building construction, nylon-polyethylene lamiante for meat packaging, abrasive coated cloth belts with extruded nylon coatings on the back sides to reduce friction and wear in use, nylon-coated printed paper and card stock for book bindings and sheet metal with ex-

TABLE I.—EFFECT OF POST POLYMERIZATION OF CAPROLACTAM GRAFT COPOLYMERS

| Example Number | Polymerization formulation | | | | Original resin properties [1] | | | Post polymerization time, hr.[5] | Post polymerized resin products | | |
|---|---|---|---|---|---|---|---|---|---|---|---|
| | Olefin copolymer | | Percent H$_2$O | Percent caprolactam | Solution viscosity [2] | Melt index [3] | Melt strength [4] | | Solution viscosity [3] | Melt index [3] | Melt strength |
| | Type | Percent | | | | | | | | | |
| 1 | | | | | | | | | | | |
| 2 | SMA3420A | 2 | 2 | 96 | 2.99 | 8.68 | 0.7 | 27 | 3.84 | 2.8 | 6.4 |
| 3 | Hydrolyzed SMA3000A | 2 | 2 | 96 | 2.82 | 12.1 | ca. 1.2 | 27 | 4.07 | 6.15 | 7.8 |
| 4 | Polymac 6 | 1 | 2 | 97 | 3.06 | 10.2 | 0.8 | 24 | 3.55 | 4.92 | 1.8 |
| 5 | EMA 11 | 1 | 2 | 97 | 4.04 | 6.86 | 1.1 | 12 | 5.29 | 3.09 | 10.0 |
| 6[6] | Benzoic acid | 0.07 | 1 | 99 | 2.84 | 9.1 | 0.6 | 24 | 3.51 | 4.62 | 1.3 |
| 7 | SMA3000A | 1 | 2 | 97 | 2.77 | 12.2 | | 20 | 3.93 | 2.54 | 4.4 |
| 8 | Same as above | 1 | 2 | 97 | 2.76 | 14.2 | 0.5 | 12 | 3.33 | 5.16 | 2.4 |
| 9 | do | 1 | 2 | 97 | 2.76 | 14.2 | 0.5 | 24 | 3.54 | 3.55 | 4.0 |
| 1 | do | 1 | 2 | 97 | 2.94 | 8.82 | 1.0 | 24 | 3.94 | 3.34 | 5.0 |
| 10 | do | 1 | 2 | 97 | 2.77 | 12.2 | | 24 | 3.80 | 3.10 | 4.9 |
| 11 | do | 2 | 2 | 96 | 2.94 | 8.8 | 1.0 | 24 | 3.94 | 3.34 | 5.0 |

[1] Measured on methanol extracted and vacuum dried (100° C., 0.2-1.0 mm. Hg, 18 hour) polymer.
[2] Relative solution viscosity measured in 90% formic acid at a concentration of 1 g. of polymer per 100 ml. of solvent.
[3] Grams per 10 minutes, measured at 235° C., 2,160 g. load.
[4] Tensional force, in grams, required to draw down the molten extrudate from a melt index apparatus; plunger speed=0.5 inches per minute; draw down rate=20 feet per minute.
[5] Post polymerizations were carried out in a drying pistol under refluxing diisobutyl ketone (B.P. 165-170° C.); Pressure=0.2-1 mm. Hg.
[6] A conventional nylon resin.

NOTE.—SMA3420A=Half ester of a styrene maleic anhydride copolymer, about 60 wt. percent styrene; SMA3000A=Styrene-maleic anhydrde copolymer, about 75 wt percent. styrene; Polymac 6=Maleic anhydride 1-hexene copolymer, about 46 wt. percent 1-hexene; EMA 11=Ethylene-maleic anhydride copolymer, about 22 wt. percent ethylene; EMA 22=Diacidform of an ethylene-maleic anhydride copolymer, about 19 wt. percent ethylene Continuous reaction Caprolactam graft copolymers may also be made experimentally on a small scale in a continuous pilot plant reactor. The continuous reactor consists of an enlarged polymerization vessel on top of a stem section. The polymerization feed enters near the circumference of the prepolymerization vessel, flows through a spiral of about ten turns to the center of the prepolymerization vessel and passes downward through the stem. The polymerization feed consists, for example, of 97.7% caprolactam, 1.3% truded nylon coatings to reduce friction and wear against the die in cold forming operations.

We claim:
1. The method of manufacturing modified caprolactam graft copolymer of high melt strength comprising the step of heating a caprolactam graft copolymer in the solid state at a temperature of at least 140° C. but below the melting point of the caprolactam graft copolymer for a period of at least 5 hours, sufficient to effect an increase in the melt strength of the graft copolymer, as measured during melt extrusion, to a value above that of polycapro- lactam having a substantially equivalent melt index, said caprolactam graft copolymer having been hydrolytically polymerized in the presence of from 0.1 percent to 4 percent of a copolymer having a molecular weight of from about 1,000 to about 75,000 of a monomer selected from maleic anhydride, maleamic acid, maleic acid, and mono esters of maleic acid with from about 20 up to about 80 weight percent of the total copolymer of a polymerizable monomer selected from the group consisting of styrene, ethylene and 1-olefins having from 3 to 18 carbon atoms.

2. The method of claim 1 in which the polymerizable monomer is styrene.

3. The method of claim 1 in which said heating is done under vacuum.

4. The method of claim 2 in which the caprolactam graft copolymer is one made by hydrolytically polymerizing caprolactam in the presence of a polymer which has a molecular weight between 1000 and 12,000.

5. An extruded film made from the product of the method of claim 1.

6. An extruded fiber made from the product of the method of claim 1.

References Cited
UNITED STATES PATENTS

| | | | |
|---|---|---|---|
| 3,539,664 | 11/1970 | Kray | 260—857 |
| 3,136,738 | 6/1964 | Hedrick | 260—857 |
| 3,243,476 | 3/1966 | Black | 260—857 |
| 3,243,477 | 3/1966 | Black | 260—857 |
| 3,325,561 | 6/1967 | Grillo | 260—857 |
| 3,388,186 | 6/1968 | Kray | 260—857 |
| 3,465,059 | 9/1969 | Seven | 260—857 |

PAUL LIEBERMAN, Primary Examiner

U.S. Cl. X.R.

117—155 R, 161 P; 161—190, 214, 216, 220, 227, 229; 260—78 S, 857 L, 857 U